United States Patent
York

(10) Patent No.: US 7,178,782 B1
(45) Date of Patent: Feb. 20, 2007

(54) QUIET OPENING BALL VALVE

(75) Inventor: Matthew E. York, Sewell, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 273 days.

(21) Appl. No.: 10/443,825

(22) Filed: May 23, 2003

(51) Int. Cl.
F16K 47/00 (2006.01)
F16L 55/02 (2006.01)

(52) U.S. Cl. ............. 251/127; 251/315.01; 137/625.3; 137/625.32

(58) Field of Classification Search ................ 251/118, 251/127, 315.01; 137/625.32, 625.31, 325.3; 138/42
See application file for complete search history.

(56) References Cited

U.S. PATENT DOCUMENTS

| | | | |
|---|---|---|---|
| 3,688,800 A | | 9/1972 | Hayner et al. |
| 3,880,191 A | * | 4/1975 | Baumann ............... 137/625.32 |
| 3,978,891 A | | 9/1976 | Vick |
| 4,279,274 A | | 7/1981 | Seger |
| 4,458,718 A | | 7/1984 | Vick |
| 5,070,909 A | * | 12/1991 | Davenport ............. 137/625.32 |
| 5,370,154 A | | 12/1994 | Greer |
| 5,769,122 A | | 6/1998 | Baumann et al. |
| 5,819,803 A | | 10/1998 | Lebo et al. |
| 5,890,505 A | * | 4/1999 | Boger ............................ 137/1 |
| 5,921,275 A | | 7/1999 | Knop et al. |
| 5,941,281 A | | 8/1999 | Baumann et al. |
| 6,026,859 A | | 2/2000 | Wears et al. |
| 6,095,196 A | | 8/2000 | McCarty et al. |
| 6,109,591 A | | 8/2000 | Tuttle et al. |
| 6,244,297 B1 | | 6/2001 | Baumann |
| 6,408,871 B1 | | 6/2002 | Ryerson et al. |

* cited by examiner

*Primary Examiner*—Edward K. Look
*Assistant Examiner*—John K. Fristoe, Jr.
(74) *Attorney, Agent, or Firm*—Howard Kaiser

(57) ABSTRACT

A valve uniquely integrates ball valve and throttling valve principals, thus affording quieter stop-and-start operation. A ball held by two seat rings is rotatable ninety degrees and has a diametric bore adjustable between fully closed (0°) and fully open (90°) positions. Oppositely disposed, relative to both the ball and the valve's longitudinal axis, are two plate assemblies each describing a tortuous fluid path. Each ring has conduits communicating with an assembly's tortuous path and communicable with the bore so that, sequentially during the ball's 0° to 90° rotation: the ball seals off the conduits, no fluid passing through the valve; all fluid passing through the valve flows through the plate assemblies and conduits; some fluid passing through the valve flows through the plate assemblies and conduits, some fluid passing through the valve flowing freely; the ball seals off the conduits, all fluid passing through the valve flowing freely.

20 Claims, 9 Drawing Sheets

QUIET OPENING BALL VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for controlling or regulating the flow of fluids, more particularly to valves for stopping and starting fluid flow, such as ball valves.

Valves are devices that are used for controlling the flow of fluid. There are several categories of valves, such as stop valves, check valves, pressure-control valves and thermostatic recirculating valves. Of particular interest herein are stop valves, which are used to partially or completely shut off fluid flow, and which generally involve fluid control via movement of a valve member such as a valve stem. Among the various types of stop valves are ball valves, globe valves, gate valves, plug valves, needle valves and butterfly valves.

Ball valves are stop valves according to which a ball having a hole (e.g., axial bore) provided therethrough is used for stopping or starting fluid flow. To open the ball valve, the ball is rotated to a position wherein the ball's hole is aligned with both the inlet and the outlet of the valve body. To close the ball valve, the ball is rotated to a position wherein the hole is perpendicular to both the inlet and the outlet of the valve body. Frequently, a valve handle or planetary gearing is used to effect a ninety degree turn, either for rotating the ball from a closed position to an open position or, conversely, for rotating the ball from an open position to a closed position. Ball valves have been used in fluid systems that require a high-pressure drop across the valve when opening.

Ball valves are excellent for most piping systems, as they provide minimal restriction to flow when fully open and a positive stop when closed. When the ball valve is opened with a high pressure on one side and a low pressure on the other side, a noise is generated during opening. As the ball rotates, it exposes a small flow passage area that gradually increases with continued rotation. The noise that is generated in the short time during which the opening takes place is significantly greater relative to the steady state flow noise that occurs after the ball valve is fully open. Thus, unwanted noise is associated with the opening of a ball valve under such circumstances wherein a high-pressure source exists on one side of the ball valve and the fluid leads to a low-pressure region on the opposite side of the ball valve.

Nor do quiet throttling valves provide a satisfactory solution to the above-described noise difficulty characterizing piping systems. Throttling valves typically are characterized by fluid path tortuosity. For instance, according to current technology of quiet throttling valves used at the Naval Surface Warfare Center, Carderock Division (NSWCCD), the fluid flow is opened to a tortuous path of a series of orifices on multiple disk stacks. This tortuous path reduces flow noise associated with fluid cavitation, which occurs as a result of a large pressure drop, by dividing up the pressure drop into a series of small pressure drops. Flow path in the quiet throttling valve is always through the disk stacks. This is undesirable in shipboard fluid systems since, in comparison with a full-open ball valve, there is a significant increase in (i) the time required to move a fluid from one location to another and (ii) the restriction in the system.

Incorporated herein by reference are the following United States patents relating to valve technology: Ryerson et al. U.S. Pat. No. 6,408,871 B1 issued Jun. 25, 2002; Baumann U.S. Pat. No. 6,244,297 B1 issued Jun. 12, 2001; Tuttle U.S. Pat. No. 6,109,591 issued Aug. 29, 2000; McCarty et al. U.S. Pat. No. 6,095,196 issued Aug. 1, 2000; Wears et al. U.S. Pat. No. 6,026,859 issued Feb. 22, 2000; Baumann et al. U.S. Pat. No. 5,941,281 issued Aug. 24, 1999; Knop et al. U.S. Pat. No. 5,921,275 issued Jul. 13, 1999; Lebo et al. U.S. Pat. No. 5,819,803 issued Oct. 13, 1998; Baumann et al. 5,769,122 issued Jun. 23, 1998; Greer U.S. Pat. No. 5,370,154 issued Dec. 6, 1994; Vick U.S. Pat. No. 4,458,718 issued Jul. 10, 1984; Seger U.S. Pat. No. 4,279,274 issued Jul. 21, 1981; Vick U.S. Pat. No. 3,978,891 issued Sep. 7, 1976; Hayner et al. U.S. Pat. No. 3,688,800 issued Sep. 5, 1972.

SUMMARY OF THE INVENTION

In view of the foregoing, it is an object of the present invention to provide a quieter methodology for effecting stop-and-start fluidic valvular function.

It is another object of the present invention to provide such a methodology wherein full fluid flow is allowed without restriction to that flow.

In accordance with many embodiments of the present invention, a fluid valve device has on opposite sides thereof a valve inlet opening and a valve outlet opening. The present invention's fluid valve device comprises a spherical object and two flow impedance units. The spherical object has running therethrough a diametric passage and is rotatable ninety degrees for adjustment between a fully closed valve position and a fully open valve position. The diametric passage is aligned with the valve inlet opening and the valve outlet opening when the fluid valve device is in the fully open valve position. The diametric passage is perpendicular to the valve inlet opening and the valve outlet opening when the fluid valve device is in the fully closed valve position. The two flow impedance units are an inlet flow impedance unit and an outlet flow impedance unit. Each flow impedance unit is characterized by flow path tortuosity for impeding fluid flow. The inlet flow impedance unit is situated at the valve inlet opening. The outlet flow impedance unit is situated at the valve outlet opening. The flow impedance units concertedly and decreasingly impede fluid flow during the adjustment of the fluid valve device from a first partially open valve position to a second partially open valve position. The flow impedance units cease to impede fluid flow upon the reaching of the second partially open valve position.

Typically according to such inventive embodiments, a third partially open valve position is intermediate said first partially open valve position and said second partially open valve position. During adjustment between the first partially open valve position and the third partially open valve position, the approximate totality of the fluid flow passing through the fluid valve passes through the two impedance units and the diametric passage. During adjustment between the third partially open valve position and the second partially open valve position, a first portion of the fluid flow passing through the fluid valve device passes through the two impedance units and the diametric passage, and a second portion of the fluid flow passing through the fluid valve device passes through the diametric passage without passing through the two impedance units. Further typically according to such inventive embodiments, during the adjustment of the fluid valve device from the first partially open valve position to the second partially open valve position (i.e., during adjustment between the first partially open valve position and the third partially open valve position, and between the third partially open valve position and the second partially open valve position), the flow impedance units together act so as to gradually reduce the pressure drop across the fluid valve device between the valve inlet opening and the valve outlet opening.

According to some such inventive embodiments, each flow impedance unit includes an odd number of at least three flat members, each flat member having at least one channel. At least two flat members each have at least one aperture. The flat members are abuttingly arranged so as to permit, through the flat members via the channels and between the flat members via the apertures, sequential fluid flow from the sequentially first flat member to the sequentially last flat member. The fluid enters the sequentially first flat member and exits the sequentially last flat member. The fluid is passable from each sequentially prior flat member to the sequentially subsequent flat member through the sequentially prior flat member's one or more apertures. The direction of the fluid flow alternates in two opposite flow directions between the sequentially odd-numbered flat members and the sequentially even-numbered flat members.

Opening noise is associated with typical operation of a conventional ball valve; the noise is generated when the ball valve opens a path from a high-pressure source on one side to a low pressure on the other side. The present invention represents a unique methodology for opening a ball valve under such conditions. The present invention's novel valvular apparatus typically describes a quietly opening ball-type valve assembly that opens against a large pressure differential across the valve in such a way as to preclude or limit the introduction of acoustic energy in the piping system.

According to many embodiments, the inventive ball valve device comprises a ball valve component and stacked disk-like members, wherein the fluid flow path is directed through the stacked disk-like members during the valve opening operation in order to reduce the generation of noise in the fluid under control. Diverse conduit systems can benefit from the present invention's quiet opening ball valve, which admits of a wide range of applications involving liquids and/or gases.

The present invention effects a kind of flow control whereby certain elements are used to produce several small pressure drops in transitioning from a high pressure to a low pressure. It would not be practical to constantly maintain elements of this nature in the main flow path of a valve, because the elements would be easily clogged and would continuously restrict the full flow once flow is established. The present invention uniquely features the implementation of elements of this nature so as to be operative for the initiation noise while a ball valve is opening, and so as to be inoperative (e.g., sealed off) subsequent to the initial opening by the ball valve's ball.

The present invention's "Quiet Opening Ball Valve" ("QOBV") uniquely combines two concepts, viz., (i) the complete "openability" characterizing a full-close, full-open ball valve, and (ii) the tortuosity (and associated quietude) characterizing a throttling valve. A full-open ball valve-type component is associated with two throttling valve-type components, each providing a tortuous path for the fluid flow (The adjectives "tortuous," "winding," "twisting," "serpentine," "labyrinthine," "sinuous," "circuitous" and "convoluted" are similarly apt descriptions of this flow path). As the ball valve rotates open, the ball valve exposes its high-pressure side to the first tortuous path, which gradually decreases in resistance until the ball valve is fully opened, at which time the ball seals off the first tortuous path. Similarly, at the same time, the ball valve exposes its low-pressure side to the second tortuous path, which gradually decreases in resistance until the ball valve is fully opened, at which time the ball seals off the second tortuous path.

Accordingly, the present invention features the association of two high impedance units (e.g., disk stacks) with a ball valve analogue, wherein the two high impedance units are situated at the entrance and exit sides, respectively, of the ball valve analogue. The inlet-placed and outlet-placed disk stacks each provide a tortuous path through which the fluid will flow during the opening and closing cycles, respectively. The disk stacks effectuate only during earlier periods of opening and closing (that is, when leaving the fully closed or fully open position) and are sealed by the ball during later periods thereof (that is, when approaching the fully open or fully closed position). Advantageously, when the valve nears or approaches a fully open position, the ball seals the passages (channels) to the disk stacks, the flow restriction thus being akin to that of a normal ball valve. When the inventive valve is fully open, the flow restriction is equivalent to that of an open pipe, viz., nonexistent or virtually so. The present invention's QOBV reduces a large pressure differential and thereby affords reduced noise during valve opening or closing. The same high impedance operation is effected by the present invention whether (i) reducing the noise associated with the opening of the inventive valve or (ii) reducing the noise associated with the closing of the inventive valve.

Other objects, advantages and features of the present invention will become apparent to the person of ordinary skill in the art based on the following detailed description of the present invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
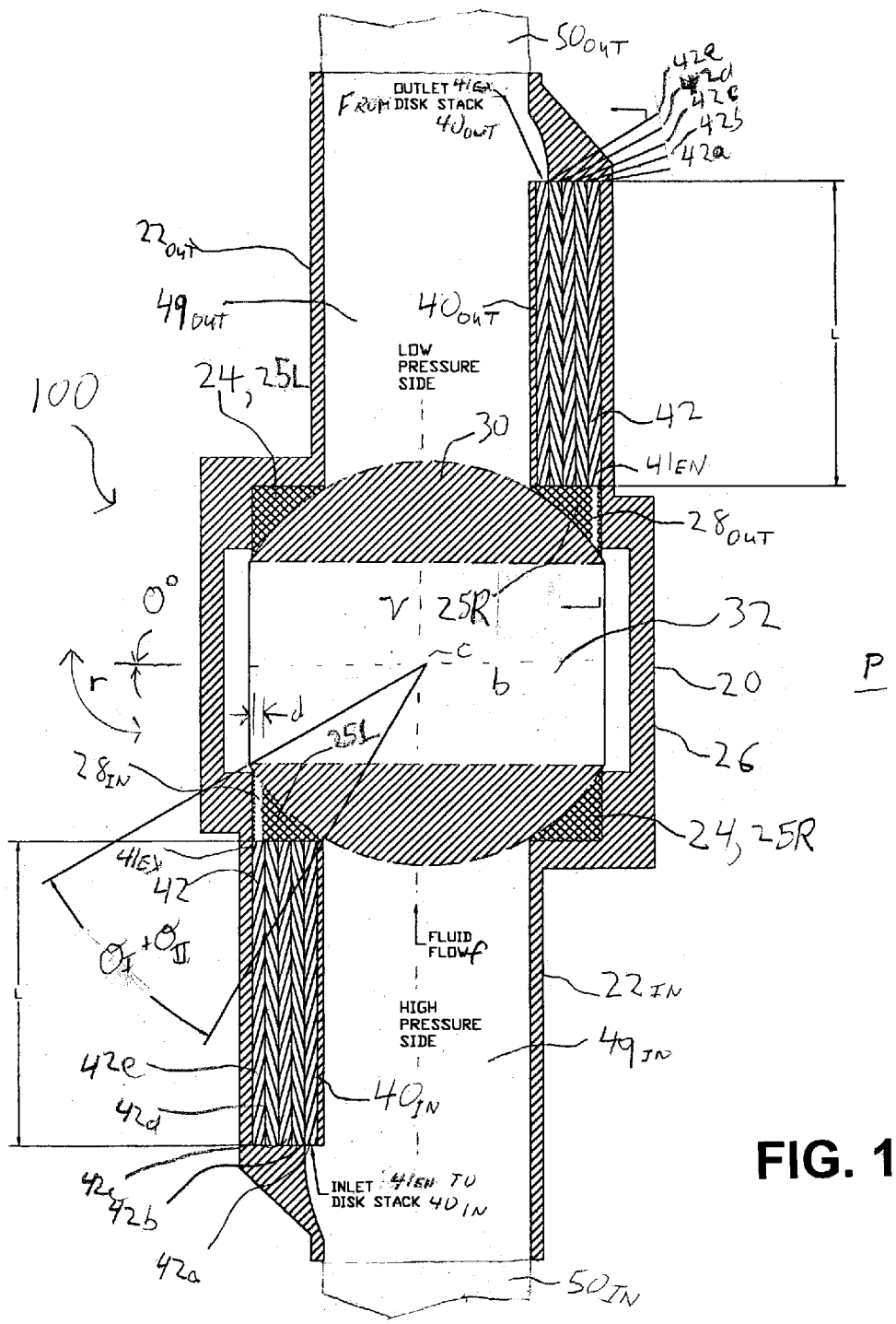
FIG. 1 is a cross-sectional longitudinal view (in the axial-longitudinal direction of the associated piping) of an embodiment of the present invention's valve, particularly illustrating the inventive valve being in the fully closed position so that there is zero flow, both disk stacks (inlet disk stack and outlet disk stack) being completely sealed off.

Reference is now made to FIG. 1 through FIG. 5, which demonstrate how the present invention efficaciously unites ball valve characteristics with throttling valve characteristics. Although the opening process of the present invention's "quiet opening ball valve" ("QOBV") 100 emphasized herein, it is to be understood that the present invention's valvular positional "stages" described herein with reference to FIG. 1 through FIG. 5 occur regardless of whether valve 100 is in the process of opening or closing—i.e., regardless of the rotational direction of ball 30.

Valve 100 includes a valve body 20, a ninety-degree-rotatable spherical ball 30, a ball seat 24, an inlet stack $40_{IN}$ and an outlet stack $40_{OUT}$. According to typical inventive embodiments, ball 30, inlet stack $40_{IN}$ and outlet stack $40_{OUT}$ will each be made of a metal or composite material, and ball seat 24 will be made of a rubber or other elastomeric material. Valve body 20 includes an inlet section $22_{IN}$, an outlet section $22_{OUT}$ and a chamber 26 therebetween. Inlet section $22_{IN}$ and outlet section $22_{OUT}$ correspond to the high pressure side and low pressure side, respectively, of valve 100. Inlet section $22_{IN}$ is connected to inlet pipe $50_{IN}$. Outlet section $22_{OUT}$ is connected to outlet pipe $50_{OUT}$. Chamber 26 encompasses ball 30. Inlet section $22_{IN}$ contains inlet free flow area $44_{IN}$ and inlet stack $40_{IN}$. Inlet stack $40_{IN}$ is attached to valve body 40 and positioned in inlet section $22_{IN}$ so as to be capable of affecting inlet flow into valve body 20. Outlet section $44_{OUT}$ contains outlet free flow area $44_{OUT}$ and outlet stack $40_{OUT}$. Outlet stack $40_{OUT}$ is attached to valve body 40 and positioned in outlet section $22_{OUT}$ so as to be capable of affecting outlet flow out of valve body 20. Ball seat 24 is attached to valve body 40 inside chamber 26.

Chamber 26 is structurally "open" so as to permit access via free flow passages $44_{IN}$ and $44_{IN}$ on the inlet and outlet sides, respectively. Provided in seat 24 are at least two passages, wherein at least one passage (shown in FIG. 1 through FIG. 5 and FIG. 12 as inlet chamber conduits $28_{IN}$) communicates with inlet stack $40_{IN}$ and at least one passage (shown in FIG. 1 through FIG. 5 and FIG. 12 as outlet chamber conduits $28_{OUT}$) communicates with outlet stack $40_{OUT}$. A set of inlet chamber conduits $28_{IN}$ connects the chamber 26 interior with a corresponding set of channels 44 of an extreme plate 42 of inlet stack $40_{IN}$, thereby permitting conduction of the fluid from inlet stack $40_{IN}$ to axial bore 32 when ball 30 is suitably positioned. Similarly, a set of outlet chamber conduits $28_{OUT}$ connects the chamber 26 interior with a corresponding set of channels 44 of an extreme plate 42 of outlet stack $40_{OUT}$, thereby permitting conduction of the fluid from axial bore 32 to outlet stack $40_{OUT}$ when ball 30 is suitably positioned. According to the embodiment shown in FIG. 1 through FIG. 5, inlet chamber conduits $28_{IN}$ and outlet chamber conduits $28_{IN}$ are passages each provided (on the inlet and outlet sides, respectively) within ball seat 24, which comprise two equivalent coaxial rings 24a and 24b disposed between ball 30 and chamber 26 so as to hold ball 30 in place. In accordance with inventive principles, the conduits connecting the ball-containing medial chamber with the fluid-restriction-causing units can be provided in any of various ways.

Still with reference to FIG. 1 through FIG. 5 and also with reference to FIG. 6 through FIG. 12, inlet stack $40_{IN}$ and outlet stack $40_{OUT}$ each represent an identical or similar assembly of identical or similar plates 42. Because of their standardized or modular nature as practiced according to many inventive embodiments, plates 42 are also referred to herein as "disks" 42, and stacks $40_{IN}$ and $40_{OUT}$ are also referred to herein as "disk stacks" $40_{IN}$ and $40_{OUT}$. The term "disk," when used herein to be synonymous with the term "plate," is not intended to imply roundness of shape, as in inventive practice the plates 42 less typically are curvilinear (e.g., round) and more typically are rectilinear (e.g., rectangular, such as shown in FIG. 6 through FIG. 11). Stacks $40_{IN}$ and $40_{OUT}$ are each shown to have the same length 1.

Figure 11:
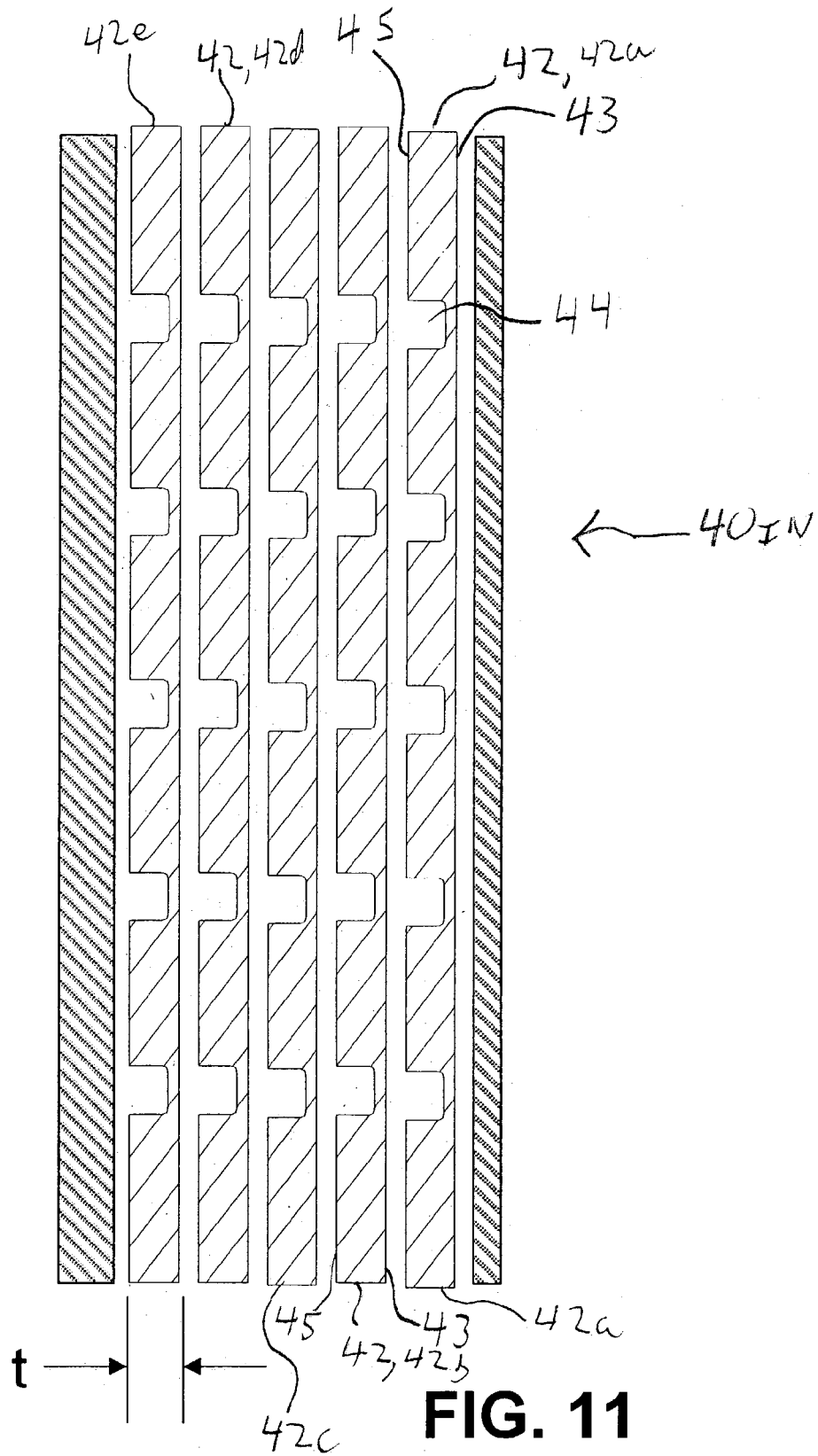
FIG. 11 is a cross-sectional view of the inlet disk stack shown in FIG. 1 through FIG. 5, also conceivably a cross-sectional view of the outlet disk stack shown in FIG. 1 through FIG. 5.
Figure 12:
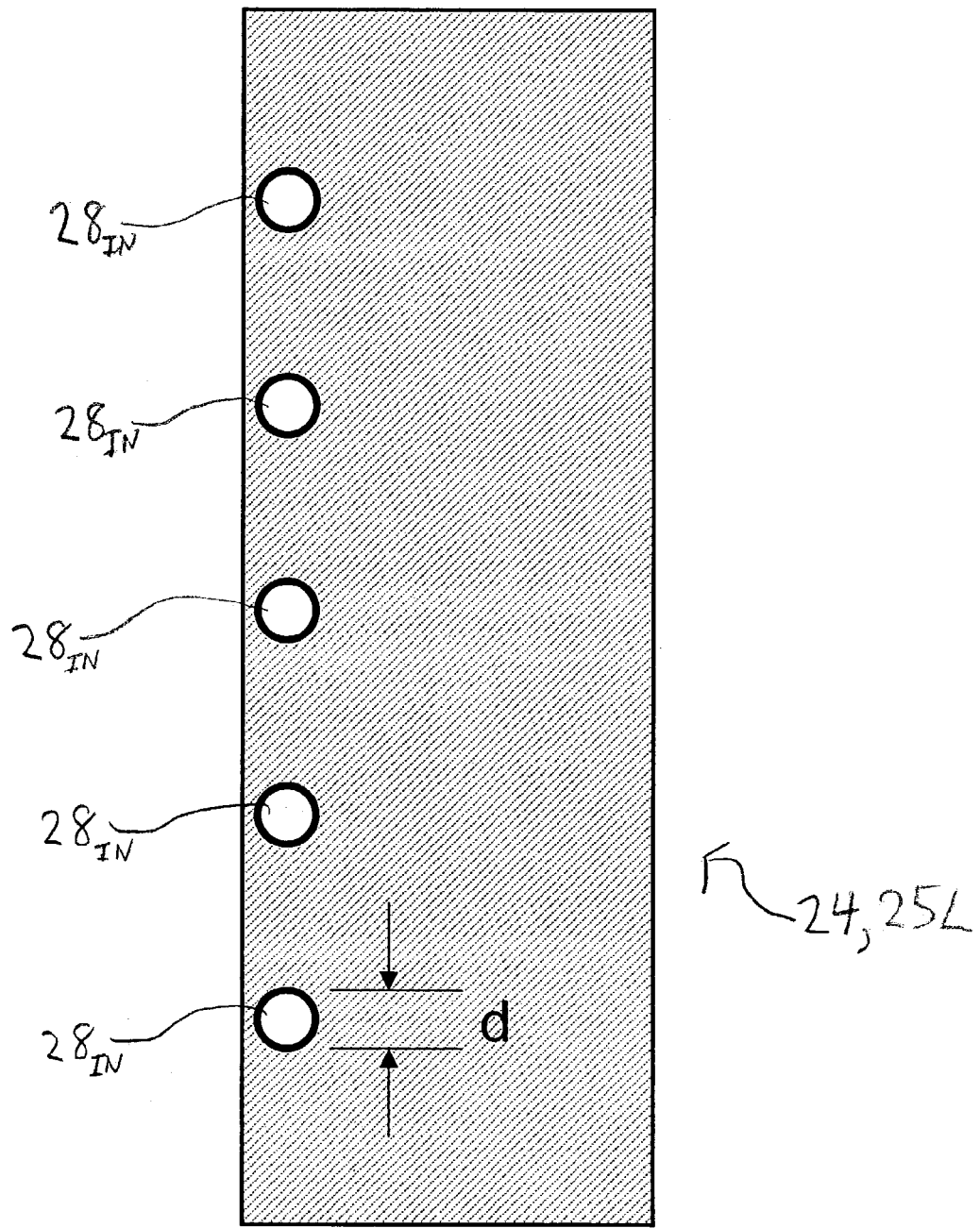
FIG. 12 is a cross-sectional view of the inlet ball seat shown in FIG. 1 through FIG. 5, also conceivably a cross-sectional view of the outlet ball seat shown in FIG. 1 through FIG. 5, particularly illustrating individual conduits provided in the ball seat that connect with corresponding channels of the extreme disk plate which directly engages the ball seat.

As depicted in FIG. 6 through FIG. 11, each plate ("disk") 42 has, on opposite sides or faces thereof, a flat side 43 and a grooved side 45. Each plate 42 is configured, on its grooved side 45, so as to include plural tortuous flow-conveying channels (grooves) 44. As best shown in FIG. 11, each stack 40 has its plates 42 abuttingly arranged so that the grooved side 45 of a given plate 42 is adjacent the flat side 43 of the next plate 42. The alternating directions of fluid flow through channels 44 are indicated by straight directional arrows g in FIG. 1. Each plate 42 in not only grooved with channels 44 but is also apertured with flow-through apertures 46 (shown in FIG. 6 through FIG. 10), located at the respective ends of channels 44, so as to permit sequential fluid conveyance from each plate 42 via apertures 46 to the next plate 42. Each plate 42 has a thickness t (as shown in FIG. 11) which (as shown in FIG. 1 through FIG. 5) is concordant with the diameter d of inlet chamber conduits $28_{IN}$ and $28_{OUT}$. In each of stacks $40_{IN}$ and $40_{OUT}$, the plate 42 which is last in fluid conveyance sequence does not require (typically, does not have) apertures 46.

FIG. 6, FIG. 7, FIG. 8, FIG. 9 and FIG. 10 show plates 42a, 42b, 42c, 42d and 42e, respectively. FIG. 6 through FIG. 11 can be considered to be generally representative of either inlet stack $40_{IN}$ or outlet stack $40_{OUT}$. In each of stacks $40_{IN}$ and $40_{OUT}$ certain configurational relationships obtain, as best shown in FIG. 11. The grooved side 45 of plate 42a is contiguous the flat side 43 of plate 42b. The grooved side 45 of plate 42b is contiguous the flat side 43 of plate 42c. The grooved side 45 of plate 42c is contiguous the flat side 43 of plate 42d. The grooved side 45 of plate 42d is contiguous the flat side 43 of plate 42e. The flat side 43 of plate 42e is contiguous a flat inner wall portion 49 of a valve section 22. Each flat inner wall portion 49 serves a similar function to that of a flat side 43 of a given plate 42 insofar as providing a contiguous barrier for a grooved side 45 of an adjacent plate 42. Optionally, depending on the inventive embodiment, the flat side 43 of plate 42a is contiguous a stack endplate 47 which is perpendicularly connected to seat 24.

With regard to fluid flow, fluid f proceeds essentially as follows. Fluid f: flows from inlet pipe $50_{IN}$ so as to enter inlet section $22_{IN}$; enters inlet stack $40_{IN}$ at entry openings $41_{EN}$ of plate 42a; flows through the channels 44 of plate 42a; flows through the apertures 46 of plate 42a; flows through the channels 44 of plate 42b; flows through the channels 44 of plate 42b; flows through the apertures 46 of plate 42b; flows through the channels 44 of plate 42c; flows through the channels 44 of plate 42c; flows through the apertures 46 of plate 42c; flows through the channels 44 of plate 42d; flows through the channels 44 of plate 42d; flows through the apertures 46 of plate 42d; flows through the channels 44 of plate 42e; exits inlet stack $40_{IN}$ through exit openings $41_{EX}$ (which are extensions of channels 44) of plate 42e; flows through the apertures 46 of plate 42e; flows through the inlet chamber conduits $28_{IN}$ of ball seat 24; flows through axial bore 32 of ball 30; flows through the outlet chamber conduits $28_{OUT}$ of ball seat 24; enters outlet stack $40_{OUT}$ at entry openings $41_{EN}$ (which are extensions of channels 44) of plate 42e; flows through the channels 44 of plate 42e; flows through the apertures 46 of plate 42e; flows through the channels 44 of plate 42d; flows through the channels 44 of plate 42d; flows through the apertures 46 of plate 42d; flows through the channels 44 of plate 42c; flows through the channels 44 of plate 42c; flows through the apertures 46 of plate 42c; flows through the channels 44 of plate 42b; flows through the channels 44 of plate 42b; flows through the apertures 46 of plate 42b; flows through the channels 44 of plate 42a; exits outlet stack $40_{OUT}$ at exit openings $41_{EX}$ (which are extensions of channels 44) of plate 42a; flows from outlet section $22_{OUT}$ so as to enter outlet pipe $50_{OUT}$.

As shown in FIG. 1 through FIG. 5 and FIG. 12, seat 24 includes two coaxial seat rings, viz., lefthand seat ring 25L and righthand seat ring 25R, which are situated on opposite sides of geometric longitudinal valve body axis v, about which valve body 20 is approximately symmetrical. Each of seat rings 25L and 25R has provided therethrough a series of passages, viz., conduits 28, which accord with the entry or exit locations 41 of the series of channels 46 of the plate 42 which is immediately associated with such seat ring. Lefthand seat ring 25L is the seat 24 portion which includes inlet chamber conduits $28_{IN}$. Righthand seat ring 25R is the seat 24 portion which includes outlet chamber conduits $28_{OUT}$. In comparison with a traditional ball valve, seat rings 25L and 25R are enlarged so as to provide a sealing surface between ball 30 and the respective disk stacks $40_{IN}$ and $40_{OUT}$. In each stack 40, only the first and last plates 42 (e.g., plates 42a and 42e as shown in the figures) include openings 41, for providing ingress or egress of fluid f with respect to such stack 40, but do not include apertures 46. The other plates 42, intermediate the extreme plates 42, each have apertures 46 that lead to the channels 44 of the next disk 42.

Ball 30 has an axial bore 32, a linear cylindrical hole or passage characterized by a circular cross-section. Ball 30 sits in its seat 24 so as to be bidirectionally rotatable ninety degrees as shown by arcuate bidirectional arrow r in FIG. 1. The manner in which ball 30 is rotated (e.g., manually such as by using a handwheel, not shown) will depend on the application, and various techniques for accomplishing such rotation will be apparent to the ordinarily skilled artisan who reads this disclosure. The geometric axis of axial bore 32 is indicated as bore axis b. Inlet section $22_{IN}$ and outlet section $22_{OUT}$ approximately define geometric longitudinal axes which approximately coincide with the geometric longitudinal valve axis v, which is approximately perpendicular with bore axis b when ball 30 is rotated to the fully closed valve 100 position (as shown in FIG. 1) and which are approximately colinear with bore axis b when ball 30 is rotated to the fully open valve 100 position (as shown in FIG. 5).

Figure 2:
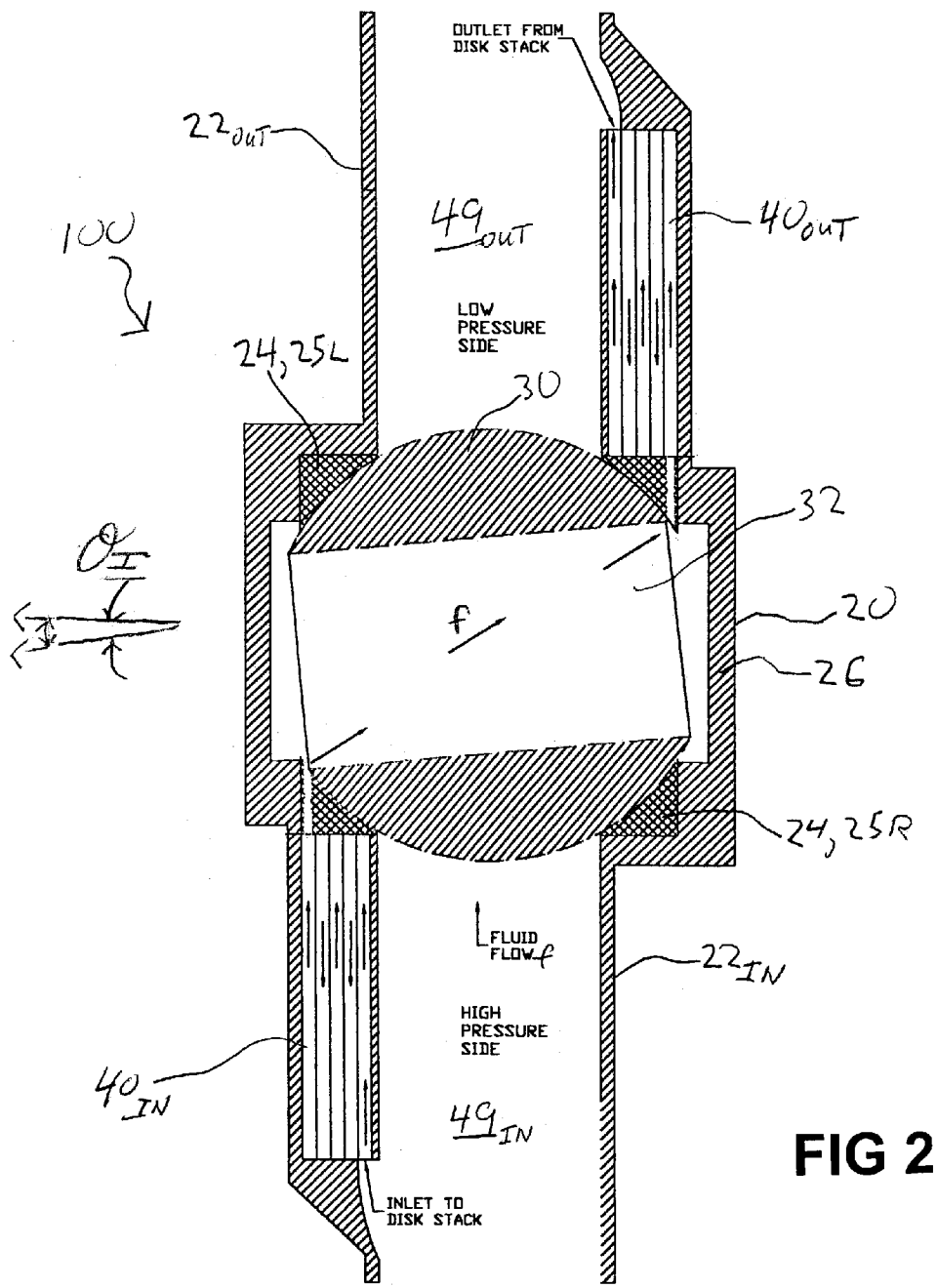
FIG. 2 is a view, similar to that shown in FIG. 1, of the inventive valve shown in FIG. 1, particularly illustrating the inventive valve being in a slightly open position, the inventive valve thus being open to the disk stacks so as to initiate flow on both disk stacks.
Figure 3:
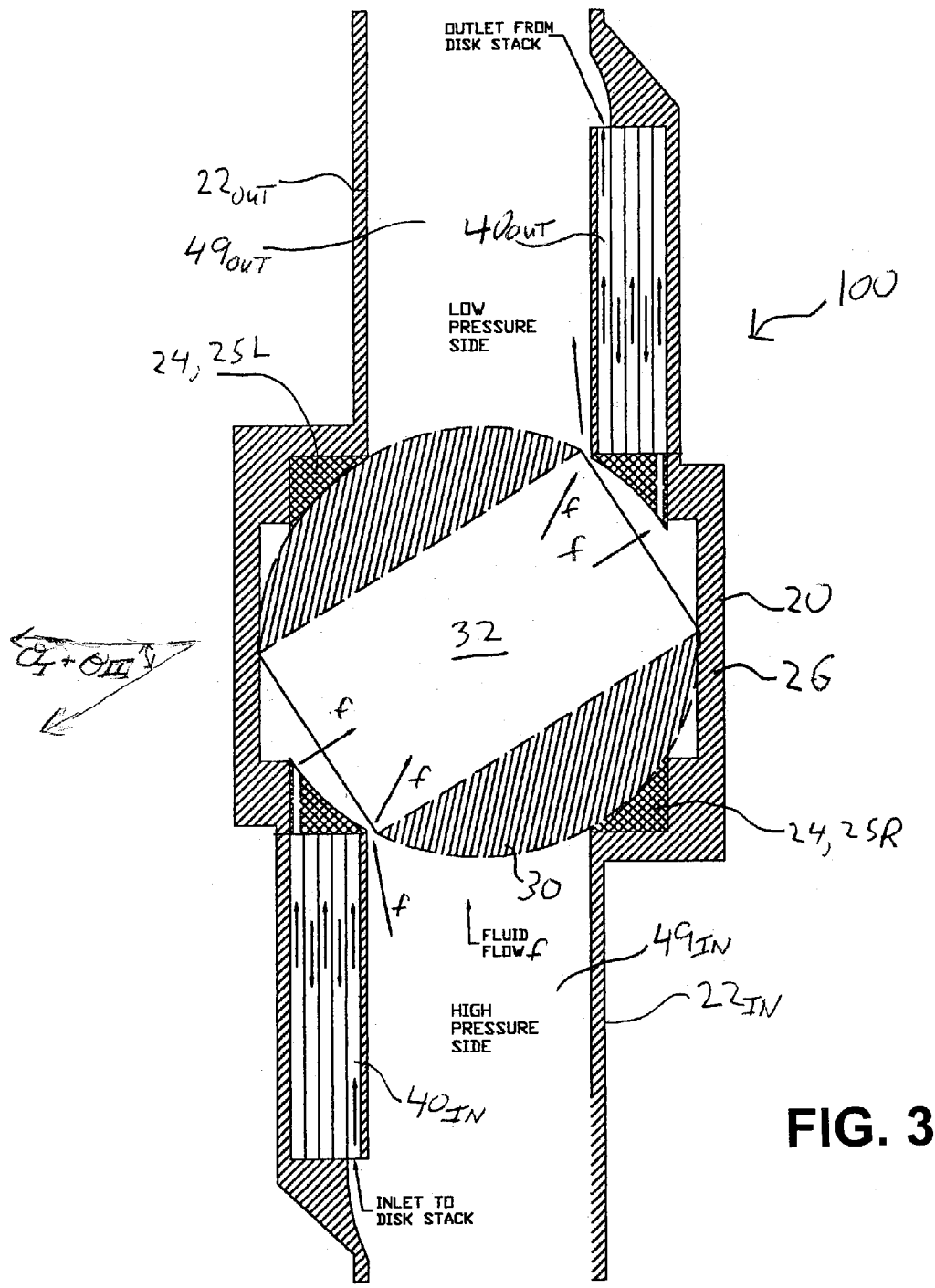
FIG. 3 is a view, similar to that shown in FIG. 1, of the inventive valve shown in FIG. 1, particularly illustrating the inventive valve being in a less than fully open position but in a more open position than as shown in FIG. 2, the inventive valve thus remaining open to the disk stacks and being opened to the free flow areas of the valve so as to initiate free flow from and to the inlet and outlet sections of the pipe.
Figure 4:
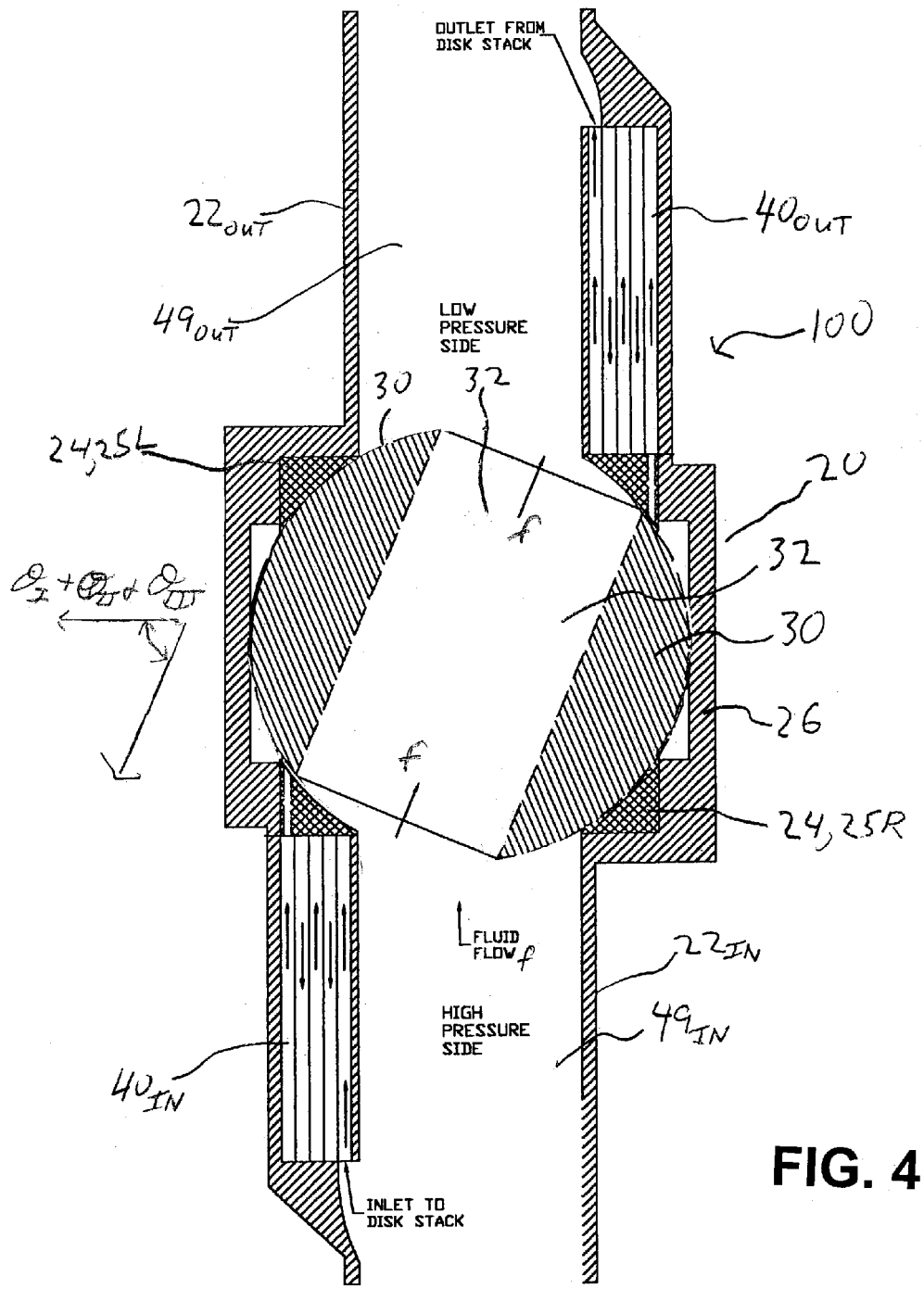
FIG. 4 is a view, similar to that shown in FIG. 1, of the inventive valve shown in FIG. 1, particularly illustrating the inventive valve being in a less than fully open position but in a more open position than as shown in FIG. 3, the inventive valve thus remaining open to the free flow areas of the valve but with both disk stacks becoming completely sealed off.
Figure 5:
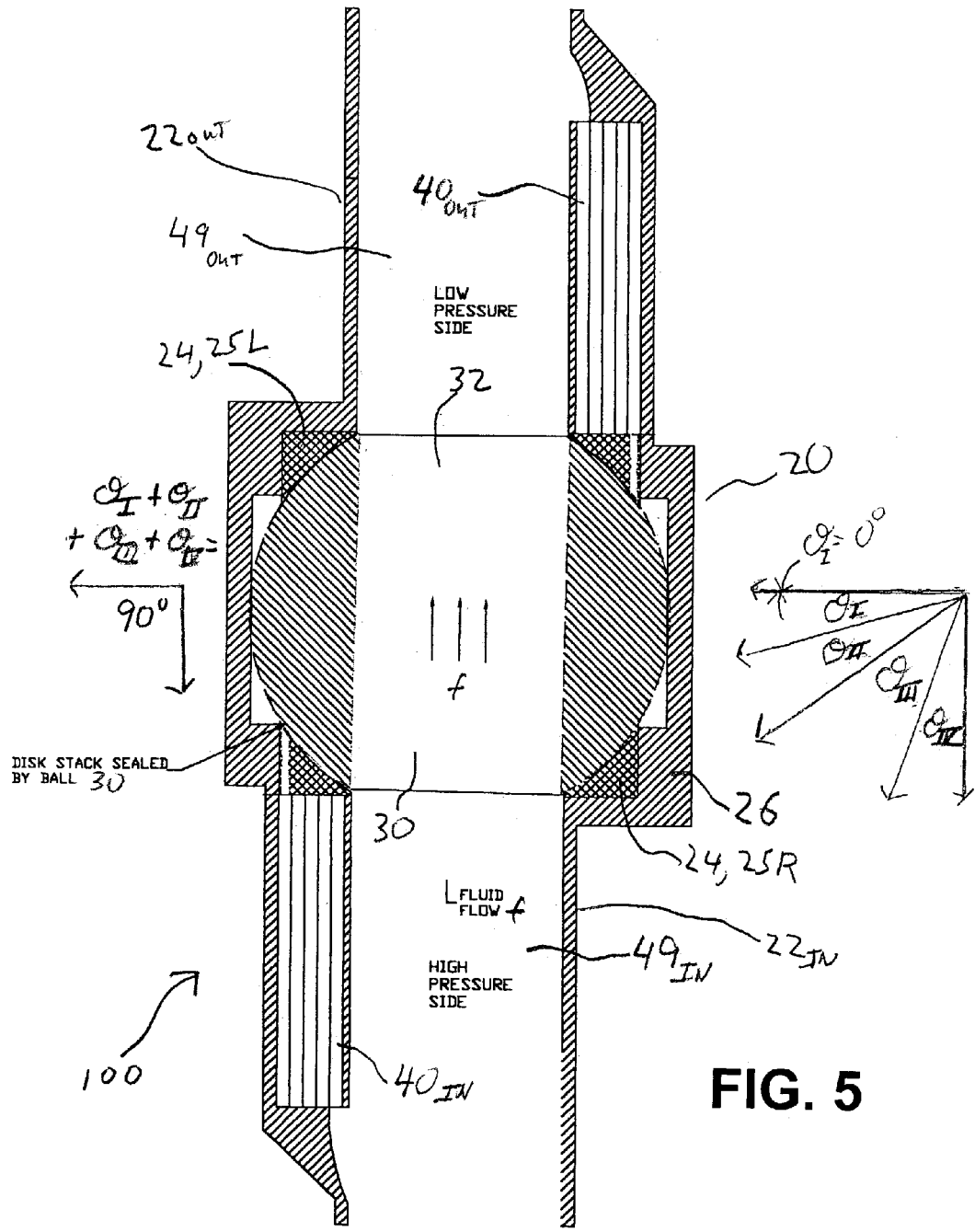
FIG. 5 is a view, similar to that shown in FIG. 1, of the inventive valve shown in FIG. 1, particularly illustrating the inventive valve being in the fully open position so that there is complete flow, both disk stacks remaining completely sealed off.
Figure 8:
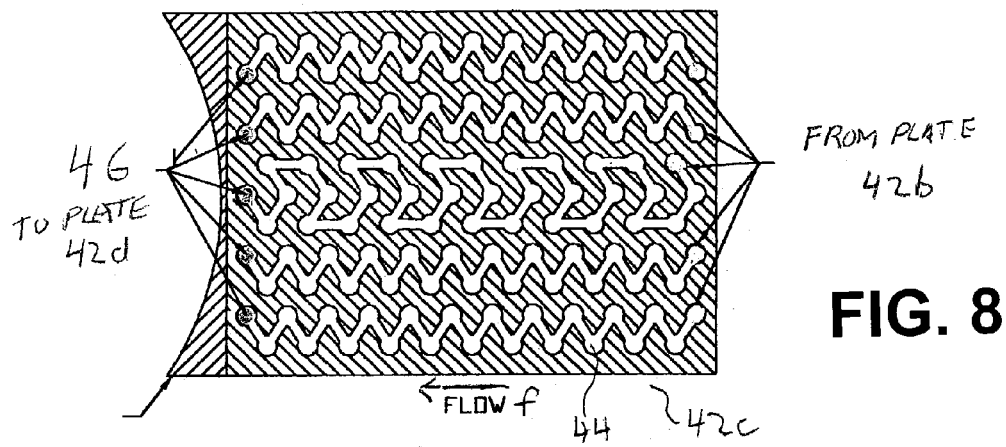
FIG. 6, FIG. 7, FIG. 8, FIG. 9 and FIG. 10 are plan views of the first, second, third, fourth and fifth disks, respectively, of the inlet disk stack shown in FIG. 1 through FIG. 5. These disks can also be conceived to be the fifth, fourth, third, second and first disks, respectively, of the outlet disk stack shown in FIG. 1 through FIG. 5.
Figure 7:
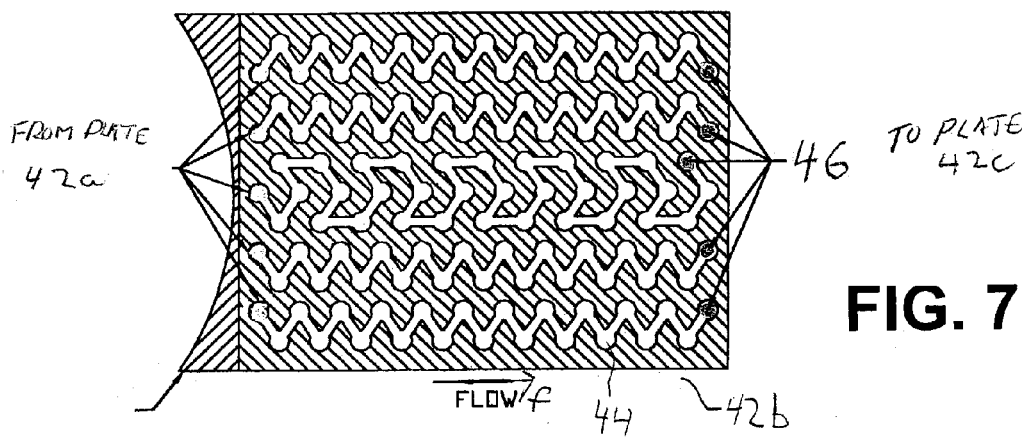
Figure 6:
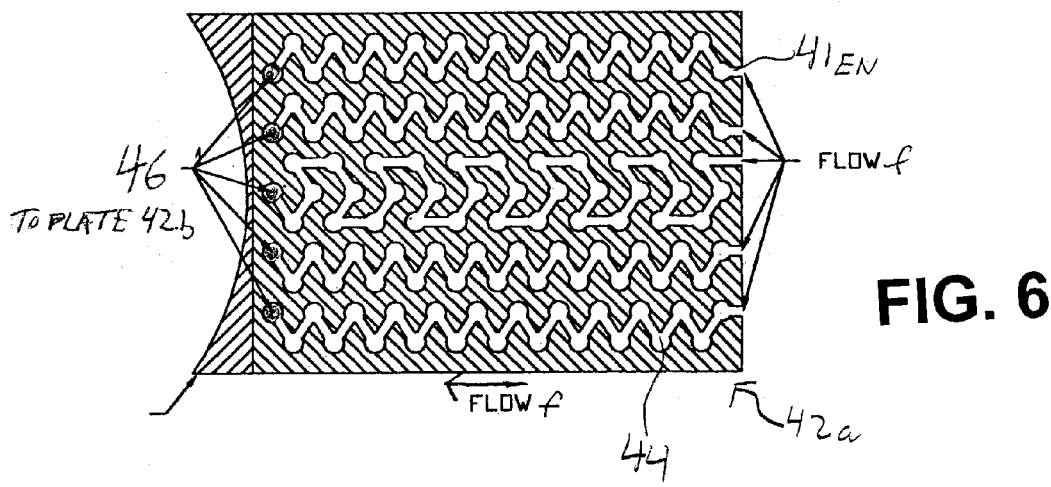
Figure 10:
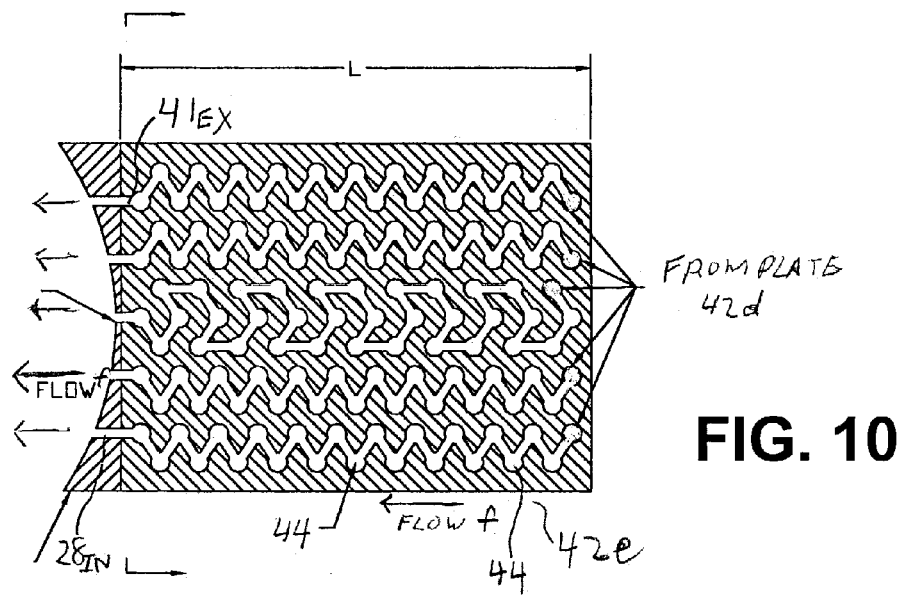
Figure 9:
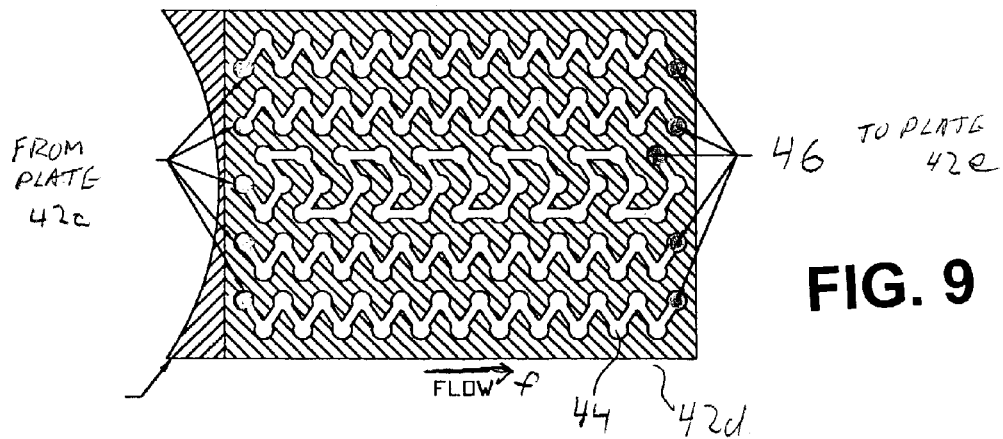

FIG. 1 through FIG. 5 together illustrate how inventive valve 100 goes through four (typically, sequential) stages as ball 30 rotates through its 90° arc, ball 30 commencing in its zero-degree (fully closed) position (shown in FIG. 1) and concluding in its ninety-degree (fully open) position (shown in FIG. 5). Valve 100 is, in sequence: (stage I; see FIG. 1) in a fluid-impassable condition (i.e., wherein no or practically no fluid crosses from inlet section $22_{IN}$ to outlet section $22_{OUT}$, or in other words wherein chamber 26 is sealed); (stage II, see FIG. 2) in a fluid-passable condition wherein all or practically all of the fluid which crosses from inlet section $22_{IN}$ to outlet section $22_{OUT}$ is conveyed through inlet stack $40_{IN}$, subsequently through bore 32, and subsequently through outlet stack $40_{OUT}$, such as shown in FIG. 2; (stage III; see FIG. 3) in a fluid-passable condition wherein some of the fluid which crosses from inlet section $22_{IN}$ to outlet section $22_{OUT}$ is conveyed through inlet stack $40_{IN}$, subsequently through bore 32, and subsequently through outlet stack $40_{OUT}$, and wherein some other of the fluid which crosses from inlet section $22_{IN}$ to outlet section $22_{OUT}$ is conveyed through inlet section $22_{IN}$ but not through (i.e., circumventive of) inlet stack $40_{IN}$, subsequently through bore 32, and subsequently through outlet section $22_{OUT}$ but not through (i.e., circumventive of) outlet stack $40_{OUT}$; and, (stage IV; see FIG. 4 and FIG. 5) in a fluid-passable condition wherein all or practically all of the fluid which crosses from inlet section $22_{IN}$ to outlet section $22_{OUT}$ is conveyed through inlet section $22_{IN}$ but not through (i.e., circumventive of) inlet stack $40_{IN}$, subsequently through bore 32, and subsequently through outlet section $22_{OUT}$ but not through (i.e., circumventive of) outlet stack $40_{OUT}$.

Inlet section $22_{IN}$ includes two ways via which fluid can potentially flow, viz., inlet stack $40_{IN}$ and inlet free flow area $49_{IN}$. Similarly, outlet section $22_{OUT}$ includes two ways via which fluid can potentially flow, viz., outlet stack $40_{OUT}$ and outlet free flow area $49_{OUT}$. During stage II, all of the fluid that crosses valve 100 flows through inlet pipe $50_{IN}$, then through inlet stack $40_{IN}$, then through inlet chamber conduit $28_{IN}$, then through axial bore 32, then through outlet chamber conduit $28_{OUT}$, then through outlet stack $40_{OUT}$, then through outlet pipe $50_{OUT}$. During stage III, some but not all of the fluid that crosses valve 100 flows through inlet pipe $50_{IN}$, then through inlet stack $40_{IN}$, then through inlet chamber conduit $28_{IN}$, then through axial bore 32, then through outlet chamber conduit $28_{OUT}$, then through outlet stack $40_{OUT}$, then through outlet pipe $50_{OUT}$. The rest of the fluid that crosses valve 100 during stage III flows through inlet pipe $50_{IN}$, then through inlet free flow area $49_{IN}$, then through axial bore 32, then through outlet free flow area $44_{OUT}$, then through outlet pipe $50_{OUT}$. During stage IV, all of the fluid that crosses valve 100 flows through inlet pipe $50_{IN}$, then through inlet free flow are $26_{IN}$, then through axial bore 32, then through outlet free flow area $49_{OUT}$, then through outlet pipe $50_{OUT}$.

Thus, the present invention's valve 100 undergoes two fluid-passable stages, viz., stages II and III, wherein some amount or percentage of the fluid crossing valve 100 proceeds through inlet stack $40_{IN}$ and outlet stack $40_{OUT}$. As illustrated in FIG. 2, during stage II, all of the fluid crossing valve 100 flows through inlet section $22_{IN}$ and outlet section $22_{OUT}$ so as to flow only through inlet stack $40_{IN}$ and outlet stack $40_{OUT}$. As illustrated in FIG. 3, during stage III, some but not all of the fluid crossing valve 100 flows through inlet stack $40_{IN}$ and outlet stack $40_{OUT}$, and the rest of the fluid crossing valve 100 flows through inlet section $22_{IN}$ and outlet section $22_{OUT}$ without flowing through inlet stack $40_{IN}$ and outlet stack $40_{OUT}$.

The stage sequence I, II, III through IV corresponds to rotation of ball 30 in the direction of the "fully" (or, synonymously, "completely") open valve 100 position (shown in FIG. 5). For rotation of ball 30 in the direction of the fully closed valve 100 position (shown in FIG. 1), the stage numbers are reversed; that is, the stage sequence IV, III, II through I corresponds to rotation of ball 30 in the direction of the fully closed valve 100 position. Each stage of the rotation of ball 30 between the fully closed valve 100 position (shown in FIG. 1) and the fully open valve 100 position (shown in FIG. 4) is associated with an acute ("minor") rotational arc existing within the overall ninety-degree ("major") rotational arc. Each rotational arc on the surface of ball 30 has an arc length that equals the product of the radius and the arc angle (viz., the central angle measured, e.g., in degrees or radians, at the center c of ball 30). As shown in FIG. 5, the stage I rotational arc angle is designated $\theta_I$; the stage II rotational arc angle is designated $\theta_{II}$; the stage III rotational arc angle is designated $\theta_{III}$; the stage IV rotational arc angle is designated $\theta_{IV}$.

According to typical inventive embodiments, the fully closed valve 100 position (viz., the zero-degree valve 100 position) is not the only valve 100 position in which fluid is impassable across valve 100. That is, corresponding to stage I, while ball 30 is rotating in either direction there exists a minor arc between the zero-degree valve 100 position and an acute-degree valve 100 position in which fluid remains impassable across valve 100, while ball 30 is rotating in either direction. Moreover, the fully open valve 100 position (viz., the ninety-degree valve 100 position) is not the only valve 100 position in which fluid is passable across valve 100 in the absence of passability through inlet stack $40_{IN}$ and outlet stack $40_{OUT}$. That is, corresponding to stage IV, while ball 30 is rotating in either direction there exists a minor arc between an acute-degree valve 100 position and the ninety-degree valve 100 position in which fluid which flows across valve 100, viz. does not flow through inlet stack $40_{IN}$ and outlet stack $40_{OUT}$. Similarly as depicted in FIG. 1 through FIG. 5, according to some inventive embodiments the stage I rotational arc angle $\theta_I$ is a relatively small arc angle, on the order of five or less degrees of arc.

Inlet stack $40_{IN}$ and outlet stack $40_{OUT}$ each describe a tortuous path for the fluid flow. Inlet section $22_{IN}$ corresponds to the high-pressure side of inventive valve 100. Outlet section $22_{OUT}$ corresponds to the low-pressure side of inventive valve 20. During stage I, ball 30 and the chamber 24 wall act in concert so as to seal off the respective tortuous paths of stacks $40_{IN}$ and $40_{OUT}$; hence, during stage I, neither stack $40_{IN}$ nor stack $40_{OUT}$ interacts with or otherwise affects fluid flow. During stage II and stage III, as ball 30 rotates openly, the high-pressure side is exposed to the tortuous path of inlet stack $40_{IN}$, and the low-pressure side is exposed to the tortuous path of outlet stack $40_{OUT}$. These respective fluidic exposures to tortuous stacks $40_{IN}$ and $40_{OUT}$ occur approximately or nearly simultaneously during stages II and III of the valve-opening process. Fluid flow resistance afforded by stacks $40_{IN}$ and $40_{OUT}$ gradually decreases until the stage III-stage IV transition point is reached (as shown in FIG. 4), prior to when valve 100 is fully (ninety degrees of arc) opened (as shown in FIG. 5). That is, during stages II and III, the respective tortuous paths of stacks $40_{IN}$ and $40_{OUT}$ each gradually decrease in resistance until valve 100 reaches stage IV, whereupon, similarly as in stage I, ball 30 and the chamber 24 wall together seal off both tortuous paths, stacks $40_{IN}$ and $40_{OUT}$ thus no longer affecting fluid flow.

During stage I (e.g., during the first few degrees of opening rotation), ball 30 is closed to every fluid pathway. Ball 30 openingly rotates during stage I until, at the inception of stage II, the disk stacks $40_{IN}$ and $40_{OUT}$ start to open to pipes $50_{IN}$ and $50_{OUT}$, respectively. During stage II, ball 30 is closed to both free flow areas $44_{IN}$ and $40_{OUT}$, and is increasingly opened to both disk stacks $40_{IN}$ and $40_{OUT}$, respectively situated on both sides of ball 30. During stage II, stacks $40_{IN}$ and $40_{OUT}$ are decreasingly resistive to fluid flow. Considering stages I and II together, ball 30 travels through opening arcs of $\theta_I$ and $\theta_{II}$ degrees in stages I and II, respectively; therefore, ball 30 travels through an opening arc of $\theta_I$ degrees plus $\theta_{II}$ degrees (i.e., $\theta_I+\theta_{II}$) until, at the inception of stage III, the free flow areas $44_{IN}$ and $40_{OUT}$ start to open to pipes $50_{IN}$ and $50_{OUT}$, respectively. During stage III, ball 30 remains open to disk stacks $40_{IN}$ and $40_{OUT}$ (which are decreasingly resistive during stage III) and is increasingly opened to both free flow areas $44_{IN}$ and $44_{OUT}$, respectively situated on both sides of ball 30). Similarly as in stage II, during stage III stacks $40_{IN}$ and $40_{OUT}$ are decreasingly resistive to fluid flow. During stage IV, ball 30 is closed to both disk stacks $40_{IN}$ and $40_{OUT}$, and is increasingly opened to both free flow areas $44_{IN}$ and $44_{OUT}$.

Valve body 20 is approximately symmetrical about a geometric longitudinal valve body axis v. Chamber 26, valve inlet section $22_{IN}$ valve outlet section $22_{OUT}$ are each approximately symmetrical about valve body axis v. Bore 32 has an axis of symmetry b. The rotatability characterizing ball 30 describes a geometric valve body plane p (conceived to be the plane of the page in each of FIG. 1 through FIG. 5) in which both valve body axis v and bore 32 axis b can be conceived to lie. Plates 42 are situated approximately parallel with respect to valve body axis v. Plates 42 are situated approximately perpendicular with respect to valve body plane p. Inlet stack $40_{IN}$ and outlet stack $40_{OUT}$ are each traversed (e.g., bisected) by valve body plane p. Inlet and outlet stacks $40_{IN}$ and $40_{OUT}$ are located approximately oppositely with respect to valve body axis v. At the conclusion of stage IV of valve 100 opening operation, the geometric axis b described by axial bore 32 approximately coincides with the geometric axis v generally described by valve body 20. That is, while ball 30 is in the ninety-degree ball axis b orientation, ball axis b is approximately coincident with valve body axis b, and the fluid is permitted to flow generally linearly through valve inlet section $22_{IN}$, bore 32 and valve outlet section $22_{OUT}$.

Disk stacks $40_{IN}$ and $40_{OUT}$ each configurationally describe a tortuous fluid path that can be designed, depending on the inventive embodiment, to effect (during stages II and III) practically any pressure drop across each such stack as may be desired. Disk stacks $40_{IN}$ and $40_{OUT}$ each represent a kind of high impedance element at the inlet and outlet (discharge) sides, respectively, of ball valve 100. Each of stacks $40_{IN}$ and $40_{OUT}$ has channels 44 and apertures 46 wherein apertures 46 are located at the extremities of channels 44. This series of channels 44 and apertures 46 provides the desired high impedance particularly during the stage II opening, and also during the stage III opening, of valve 100. By providing respective tortuous paths for the fluid, stacks $40_{IN}$ and $40_{OUT}$ act in concert during stage II so as to initially reduce the fluid velocity and so as to gradually reduce the fluid pressure from the high-pressure (inlet) side to the low-pressure (outlet) side. On the high-pressure side, disk stack $40_{IN}$ is flooded prior to the opening of valve 100. When ball 100 rotates past the conduits $28_{EX}$ of disk stack $40_{IN}$, fluid flow is initiated. Since the fluid path is through both sets of disk stacks 40, the initial velocity will be lower than that which would be associated with a traditional kind of valve opening system which directly leads to and from the pipes. Typically, the present invention's total pressure drop from high pressure to low pressure will be the same, as compared with the total pressure drop associated with a traditional valve, however, according to typical embodiments of the present invention, the total pressure drop will occur in the passages over several small steps or increments, thereby reducing the cavitation in the fluid, which can be a significant source of noise.

During stage II, as ball 30 continues to rotate, the channels 44 of each plate 42 open to the channels 44 of the next plate 42. Thus, in each of disk stacks $40_{IN}$ and $40_{OUT}$, each succeeding set of channels 44 is opened, thereby allowing more fluid flow through the plate 42 channels 44 of such stack. In each of stacks $40_{IN}$ and $40_{OUT}$, in the process of the ball 30 rotation during stage II, the additional tortuous path increases the flow area and decreases the pressure drop through such stack. Just before the commencement of stage III (at which point ball 30 begins to open to pipes $50_{IN}$ and $50_{OUT}$, respectively, as shown in FIG. 3), each of stacks $40_{IN}$ and $40_{OUT}$ has approximately five percent pipe flow through such stack. Thus, when ball 30 opens to the inlet and outlet free flow areas $26_{IN}$ and $26_{OUT}$ (of valve sections $22_{IN}$ and $22_{OUT}$, respectively), flow will already have been established, thereby reducing the pressure drop across valve 100 and concomitantly reducing the opening noise. At the commencement of stage IV, shown in FIG. 4, ball 30 begins to completely seal off the flow path through stacks $40_{IN}$ and $40_{OUT}$. During stage IV, ball 30 is completely sealed to stacks $40_{IN}$ and $40_{OUT}$, and axial bore 32 admits and transmits fluid flow solely via the inlet and outlet free flow areas $26_{IN}$ and $26_{OUT}$ (of valve sections $22_{IN}$ and $22_{OUT}$, respectively). As shown in FIG. 5, valve 100 is fully opened, ball 30 continuing to completely seal off the flow path through stacks $40_{IN}$ and $40_{OUT}$. Thus, when valve is in the fully open position as shown in FIG. 5, the flow path is left fully open in a manner similar to that of a traditional ball valve.

In conventional practice, ball valve opening time has been proven to affect the level of the opening noise. Accordingly, in inventive practice, depending on the pressure drop across the inventive valve 100, the opening time of valve 100 can be varied. A large pressure drop will require a slow valve 100 opening to take advantage of the disk stacks $40_{IN}$ and $40_{OUT}$ so as to release the pressure across the valve 100. This can be achieved by hydraulic operation of the valve 100 or by changing from a manual valve actuator to an electric valve actuator. With recent advances in electronic valve actuation, the valve 100 opening could precisely be controlled. For many inventive embodiments, an extended valve 100 opening time (e.g., a few seconds between a fully closed stage I position and a fully open stage IV position) should provide the disk stacks $40_{IN}$ and $40_{OUT}$ a sufficient amount of time to suitably reduce the pressure drop across the valve 100 during stage II while establishing flow through the valve 100 prior to the commencement of stage III, at which point ball 32 begins to open to the free flow areas $26_{IN}$ and $26_{OUT}$ of valve sections $22_{IN}$ and $22_{OUT}$, respectively.

Disk stacks $40_{IN}$ and $40_{OUT}$ can be tailored to suit a required pressure drop or flow rate, depending upon the embodiment of the present invention; in particular, inventive disk stack parameters which can be modified, as required, include: the number of plates ("disks") 42 in each of disk stacks $40_{IN}$ and $40_{OUT}$; the number of channels 44; the number of flow-through apertures 46; the sizes (e.g., length and/or width) and configurations of channels 44 (e.g., the shape or arrangement of the overall tortuous path provided by the channels 44 of a plate 42); the sizes (e.g., diameter) and configurations of flow-through apertures 46. For instance, each plate 42 is shown herein, in a preferred inventive embodiment, to be provided with five tortuous channels 44, wherein four channels 44 are similar and the middle channel 44 differs from other four channels 44. However, the numbers and shapes of channels 44 per plate 42 are variable; depending on the inventive embodiment, an individual plate 42 can include one or any plural number of channels 44 which can be characterized by any among diverse combinations of homogenous or heterogeneous shapes and configurations.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A fluid valve device having on opposite sides thereof a valve inlet opening and a valve outlet opening, said fluid valve device comprising:
    a spherical object having therethrough a diametric passage, said spherical object being rotatable ninety degrees for adjustment between a fully closed valve position and a fully open valve position, said diametric passage being aligned with said valve inlet opening and said valve outlet opening when said fluid valve device is in said fully open valve position, said diametric passage being perpendicular to said valve inlet opening and said valve outlet opening when said fluid valve device is in said fully closed valve position; and
    two flow impedance units, said flow impedance units being an inlet flow impedance unit and an outlet flow impedance unit, each said flow impedance unit being characterized by flow path tortuosity for impeding fluid flow, said inlet flow impedance unit being situated at said valve inlet opening, said outlet flow impedance unit being situated at said valve outlet opening, said flow impedance units decreasingly and concertedly impeding fluid flow during the adjustment of said fluid valve device from a first partially open valve position to a second partially open valve position, said flow impedance units ceasing to impede fluid flow upon the reaching of said second partially open valve position.

2. The fluid valve device according to claim 1 wherein, during said adjustment of said fluid valve device from said first partially open valve position to said second partially open valve position, said flow impedance units together act so as to gradually reduce the pressure drop across said fluid valve device between said valve inlet opening and said valve outlet opening.

3. The fluid valve device according to claim 1, wherein:
    a third partially open valve position is intermediate said first partially open valve position and said second partially open valve position;

during the adjustment between said first partially open valve position and said third partially open valve position, the approximate totality of the fluid flow passing through said fluid valve passes through said two impedance units and said diametric passage; and during the adjustment between said third partially open valve position and said second partially open valve position, a first portion of the fluid flow passing through said fluid valve device passes through said two impedance units and said diametric passage, and a second portion of the fluid flow passing through said fluid valve device passes through said diametric passage without passing through said two impedance units.

4. The fluid valve device according to claim 1, wherein each said flow impedance unit includes an odd number of at least three flat members, said flat members each having at least one channel, at least two said flat members each having least one aperture, said flat members being abuttingly arranged so as to permit, through said flat members via said channels and between said flat members via said apertures, sequential fluid flow from the sequentially first said flat member to the sequentially last said flat member, said fluid entering the sequentially first said flat member and exiting the sequentially last said flat member, the direction of said fluid flow alternating in two opposite flow directions between the sequentially odd-numbered said flat members and the sequentially even-numbered said flat members, said fluid being passable from each said flat member to the sequentially next said flat member through said at least one aperture.

5. The fluid valve device according to claim 4, wherein, upon said reaching of said second partially open valve position, the fluid pressure differential existing between said valve inlet opening and said valve outlet opening is less than that which would exist in the absence of said flow impedance units.

6. The fluid valve device according to claim 4, wherein:
in said inlet flow impedance unit, the direction of said fluid flow is generally toward said spherical object in each sequentially odd-numbered said flat member, and the direction of said fluid flow is generally away from said spherical object in each sequentially even-numbered said flat member; and
in said outlet flow impedance unit, the direction of said fluid flow is generally away from said spherical object in each sequentially odd-numbered said flat member, and the direction of said fluid flow is generally toward said approximately spherical object in each sequentially even-numbered said flat member.

7. The fluid valve device according to claim 6, wherein:
in said inlet flow impedance unit, the direction of said fluid flow is generally toward said spherical object in both the sequentially first said flat member and the sequentially last said flat member; and
in said outlet flow impedance unit, the direction of said fluid flow is generally away from said spherical object in both the sequentially first said flat member and the sequentially last said flat member.

8. The fluid valve device according to claim 7, wherein each said flow impedance unit includes an odd number of at least three flat members, and wherein said fluid is passable from each said flat member to the sequentially next said flat member through said at least one aperture.

9. The fluid valve device according to claim 8 wherein, during said adjustment of said fluid valve device from said first partially open valve position to said second partially open valve position, the pressure drop across said fluid valve device gradually decreases in accordance with increased fluid flow associated with rotation of said spherical object.

10. A valve for controlling the flow of fluid, wherein:
said valve comprises an apertured sphere, a first flow restriction structure, a second flow restriction structure and a housing;
said housing is for said apertured sphere, said first flow restriction structure and said second flow restriction structure;
said apertured sphere is rotatable so as to define an approximately ninety degree arc of rotation from a completely closed valve state to a completely open valve state;
said first flow restriction structure and said second flow restriction structure each describe a tortuous pathway for restricting said flow;
said housing includes a first passage and a second passage;
said first passage leads to said apertured sphere;
said second passage leads from said apertured sphere;
said first fluid restriction structure rests in said first passage;
said second fluid restriction structure rests in said second passage; and
during an acute arc of said rotation commencing subsequent to said completely closed valve state, the approximate entirety of said flow which proceeds through said first passage and said second passage proceeds through said first fluid restriction structure and said second fluid restriction structure, said approximate entirety of said flow proceeding through said first fluid restriction structure before proceeding through said apertured sphere, said approximate entirety of flow proceeding through said second fluid restriction structure after proceeding through said apertured sphere.

11. The valve as recited in claim 10, wherein:
said acute arc of said rotation is a first acute arc of said rotation;
a second acute arc of said rotation follows said first acute arc of said rotation and terminates prior to said completely open valve state;
during said second acute arc of said rotation:
a first portion of said flow which proceeds through said first passage and said second passage proceeds through said first fluid restriction structure and said second fluid restriction structure, said first portion of said flow proceeding through said first fluid restriction structure before proceeding through said apertured sphere, said first portion of said flow proceeding through said second fluid restriction structure after proceeding through said apertured sphere; and
a second portion of said flow which proceeds through said first passage and said second passage proceeds neither through said first fluid restriction structure nor through said second fluid restriction structure, said second portion of said flow proceeding through said first passage before proceeding through said apertured sphere, said second portion of said flow proceeding through said second passage after proceeding through said apertured sphere.

12. The valve as recited in claim 11 wherein, during said first acute arc of said rotation:
the restriction by said first flow restriction structure of said approximate entirety of said flow proceeding through said first fluid restriction structure decreases with increasing said rotation;
the restriction by said second flow restriction structure of said approximate entirety of said flow proceeding through said second fluid restriction structure decreases with increasing said rotation;

the pressure difference between fluid entry of and fluid exit from said first flow restriction structure decreases with increasing said rotation;

the pressure difference between fluid entry of and fluid exit from said second flow restriction structure decreases with increasing said rotation; and the pressure difference between fluid entry of said first passage and fluid exit from said second passage decreases with increasing said rotation.

13. Valvular apparatus comprising a valve body, a ball, an ingress stack of contiguously parallel plates, and an egress stack of contiguously parallel plates; said valve body enclosing said ball, said ingress stack and said egress stack; said valve body having at opposite ends a valve ingress section and a valve egress section and having a chamber intermediate said valve ingress section and said valve egress section; said ingress stack being situated in said valve ingress section; said egress stack being situated in said valve egress section; said ball being situated in said chamber; said ball including a bore describing a geometric ball axis about which said ball is symmetrical; said ball being characterized by ninety degree uniplanar rotatability of said ball between a zero-degree ball axis orientation and a ninety-degree ball axis orientation; said valvular apparatus being in a maximally obstructive condition when said ball is in said zero-degree ball axis orientation; said valvular apparatus being in a minimally obstructive condition when said ball is in said ninety-degree ball axis orientation; said ball being in an acute-degree ball axis orientation in the interim between said zero-degree ball axis orientation and said ninety-degree ball axis orientation; each said plate having at least one convoluted groove; each said stack being configured so as to be capable of conveying fluid along said convoluted grooves so that the direction of fluid conveyance by each succeeding said plate is essentially opposite the direction of fluid conveyance by each preceding said plate; said valvular apparatus being adaptable to association with fluid piping whereby fluid can enter and exit said valve body during a period while said valvular apparatus is not in said maximally obstructive condition, wherein:

while said ball is in said zero-degree ball axis orientation, said bore is orthogonal with respect to said valve entrance and said valve exit;

while said ball is in said ninety-degree ball axis orientation, said bore is in alignment with respect to said valve entrance and said valve exit;

while said ball is in said acute-degree ball axis orientation, said bore is neither in alignment nor orthogonal with respect to said valve entrance and said valve exit;

while said ball is in said zero-degree ball axis orientation, said fluid is prevented from flowing into or out of said bore;

while said ball is in said ninety-degree ball axis orientation, said fluid is permitted to: flow through said valve ingress section so as to at least substantially avoid flowing through said ingress stack; flow through said bore; and flow through said valve egress section so as to at least substantially avoid flowing through said egress stack; and during a period while said ball is in said acute-degree ball axis orientation, said fluid is permitted to: flow through said valve ingress section so as to at least partially flow through said ingress stack; flow through said bore; and flow through said valve egress section so as to at least partially flow through said egress stack.

14. The valvular apparatus as defined in claim 13, wherein:

each said stack serves to restrict fluid flow; and during said period while said ball is in said acute-degree ball axis orientation, each said stack becomes progressively less restrictive of fluid flow as said ball rotates toward said ninety-degree ball axis orientation.

15. The valvular apparatus as defined in claim 13, said valvular apparatus further comprising a seat for holding said ball.

16. The valvular apparatus as defined in claim 13, wherein:

said valve body is symmetrical about a geometric longitudinal valve body axis;

said chamber, said valve ingress section and said valve egress section are each symmetrical about said valve body axis;

the rotatability characterizing said ball describes a geometric valve body plane which in which said valve body axis lies;

said plates are parallel with respect to said valve body axis;

said plates are perpendicular with respect to said valve body plane;

said ingress stack and said egress stack are each traversed by said valve body plane; and said ingress stack and said egress stack are oppositely located with respect to said longitudinal axis.

17. The valvular apparatus as defined in claim 13 wherein:

said period while said ball is in said acute-degree ball axis orientation includes a subperiod; and during said subperiod, said fluid is permitted to: flow through said valve ingress section so as to at least substantially flow through said ingress stack; and flow through said valve egress section so as to at least substantially flow through said egress stack.

18. The valvular apparatus as defined in claim 17 wherein:

said subperiod is a first subperiod;

said period includes a second subperiod following said first subperiod;

during said second subperiod, said fluid is permitted to:

flow through said valve ingress section so as to partially flow through said ingress stack and partially avoid flowing through said ingress stack; and flow through said valve egress section so as to partially flow through said egress stack and partially avoid flowing through said egress stack.

19. The valvular apparatus as defined in claim 18, wherein:

said valve body is approximately symmetrical about a geometric longitudinal valve body axis;

said chamber, said valve ingress section and said valve egress section are each approximately symmetrical about said valve body axis;

the rotatability characterizing said ball describes a geometric valve body plane which passes through said valve body axis;

said plates are parallel with respect to said valve body axis;

said plates are perpendicular with respect to said valve body plane;

said ingress stack and said egress stack are each traversed by said valve body plane; and said ingress stack and said egress stack are located approximately oppositely with respect to said longitudinal axis.

20. The valvular apparatus as defined in claim 19 wherein, while said ball is in said ninety-degree ball axis orientation:

said ball axis is approximately coincident with said valve body axis; and said fluid is permitted to flow generally linearly through said valve ingress section, said bore and said valve egress section.

* * * * *